US011930842B2

(12) United States Patent
Batista et al.

(10) Patent No.: US 11,930,842 B2
(45) **Date of Patent: *Mar. 19, 2024**

(54) FLEXIBLE AEROSOL-GENERATING DEVICES

(71) Applicant: Altria Client Services LLC, Richmond, VA (US)

(72) Inventors: Rui Nuno Batista, Morges (CH); Stephane Antony Hedarchet, Pully (CH)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/178,899

(22) Filed: Mar. 6, 2023

(65) Prior Publication Data

US 2023/0200438 A1 Jun. 29, 2023

Related U.S. Application Data

(63) Continuation of application No. 17/463,696, filed on Sep. 1, 2021, now Pat. No. 11,602,166, which is a (Continued)

(30) Foreign Application Priority Data

Dec. 24, 2015 (EP) .................................... 15202727

(51) Int. Cl.

| | |
|---|---|
| ***A24F 40/40*** | (2020.01) |
| ***A24F 40/10*** | (2020.01) |
| ***H05B 1/02*** | (2006.01) |

(52) U.S. Cl.

CPC ........... *A24F 40/40* (2020.01); *H05B 1/0244* (2013.01); *A24F 40/10* (2020.01); *H05B 2203/021* (2013.01); *H05B 2203/022* (2013.01)

(58) Field of Classification Search

CPC .......... A24F 40/40; A24F 40/10; A24F 40/46; A24F 40/50; A24F 47/00; H05B 1/0244; (Continued)

(56) References Cited

U.S. PATENT DOCUMENTS

| | | |
|---|---|---|
| 4,265,236 A | 5/1981 | Pacella |
| 5,894,841 A | 4/1999 | Voges |

(Continued)

FOREIGN PATENT DOCUMENTS

| | | |
|---|---|---|
| CN | 103237644 A | 8/2013 |
| CN | 103948172 A | 7/2014 |

(Continued)

OTHER PUBLICATIONS

Extended European Search Report for European Patent Application No. 15202727.2 dated Jun. 7, 2016.

(Continued)

*Primary Examiner* — Briggitte R. Hammond

(74) *Attorney, Agent, or Firm* — Harness, Dickey & Pierce, P.L.C.

(57) ABSTRACT

An aerosol-generating device may include a housing having flexible portion along its length. The flexible portion is configured to transition between a relaxed or unloaded configuration and a flexed or deflected configuration. A flexible heating element and mouthpiece may also be disposed in the housing. When the housing is in a relaxed or unloaded configuration, the flexible heating element and the mouthpiece are at least partially longitudinally aligned with the flexible portion of the housing.

16 Claims, 9 Drawing Sheets

Related U.S. Application Data continuation of application No. 16/924,378, filed on Jul. 9, 2020, now Pat. No. 11,129,242, which is a continuation of application No. 16/733,483, filed on Jan. 3, 2020, now Pat. No. 10,757,969, which is a continuation of application No. 16/257,775, filed on Jan. 25, 2019, now Pat. No. 10,524,515, which is a continuation of application No. 15/386,720, filed on Dec. 21, 2016, now Pat. No. 10,206,432, which is a continuation of application No. PCT/EP2016/080478, filed on Dec. 9, 2016.

(58) Field of Classification Search

CPC ....... H05B 2203/021; H05B 2203/022; A61M 15/06

See application file for complete search history.

(56) References Cited

U.S. PATENT DOCUMENTS

| | | | | |
|---|---|---|---|---|
| 8,327,844 | B2 | 12/2012 | Djupesland | |
| 10,206,432 | B2 * | 2/2019 | Batista | H05B 1/0244 |
| 2002/0008122 | A1 | 1/2002 | Ritsche et al. | |
| 2012/0138637 | A1 | 6/2012 | Ciavarella et al. | |
| 2014/0249601 | A1 | 9/2014 | Bachinski et al. | |
| 2015/0013692 | A1 | 1/2015 | Liu | |
| 2015/0264978 | A1 | 9/2015 | Arnel et al. | |

FOREIGN PATENT DOCUMENTS

| | | | |
|---|---|---|---|
| CN | 104135879 | A | 11/2014 |
| CN | 104323427 | A | 2/2015 |
| EP | 2817051 | A1 | 12/2014 |
| KR | 2012-0089546 | A | 8/2012 |
| KR | 101250015 | B1 | 4/2013 |
| WO | WO-2011015825 | A1 | 2/2011 |

OTHER PUBLICATIONS

International Search Report and Written Opinion dated Mar. 16, 2017 for corresponding International Application No. PCT/EP2016/080478.

International Preliminary Report on Patentability for corresponding International Application No. PCT/EP2016/080478 dated Jun. 26, 2018.

Russian Office Action and Search Report for corresponding Application No. 2018126873, dated Mar. 11, 2020, English translation thereof.

Russian Notice of Allowance for corresponding Application No. 2018126873, dated Jun. 8, 2020.

Chinese Office Action and Search Report for corresponding Application No. 201680070207.3, dated Jun. 23, 2020.

Office Action dated Nov. 2, 2020 issued in corresponding Japanese Patent Application No. 2018-530783.

Office Action for Chinese Patent Application No. 201680070207.3 dated Dec. 22, 2020 and English translation thereof.

Office Action dated May 27, 2021 issued in corresponding Chinese Patent Application No. 201680070207.3.

Decision to Grant dated Jul. 12, 2021 issued in corresponding Japanese Patent Application No. 2018-530783 and English translation thereof.

Chinese Rejection dated Sep. 15, 2021 issued in corresponding Chinese Patent Application No. 201680070207.3.

European office action dated Jan. 4, 2022 corresponding to European Patent Application No. 16809058.7.

Office action dated Oct. 6, 2022 for corresponding U.S. Appl. No. 17/463,696.

Office Action for Korean Application No. 10-2018-7016098 dated Nov. 23, 2023.

* cited by examiner

FLEXIBLE AEROSOL-GENERATING DEVICES

CROSS-REFERENCE TO RELATED APPLICATIONS

This is a continuation of U.S. application Ser. No. 17/463,696, filed Sep. 1, 2021, which is a continuation of U.S. application Ser. No. 16/924,378, filed Jul. 9, 2020, which is a continuation of U.S. application Ser. No. 16/733,483, filed Jan. 3, 2020, which is a continuation of U.S. application Ser. No. 16/257,775, filed Jan. 25, 2019, which is a continuation of U.S. application Ser. No. 15/386,720, filed on Dec. 21, 2016, which is a continuation of PCT/EP2016/080478, filed on Dec. 9, 2016, which claims priority to EP 15202727.2, filed on Dec. 24, 2015, the contents of each of which are hereby incorporated by reference in their entirety.

BACKGROUND

Field

Example embodiments relate to an aerosol-generating device and components for an aerosol-generating device. At least some example embodiments are also applicable to electrically operated aerosol-generating devices, such as electrically operated vaping devices.

Description of Related Art

Aerosol-generating devices may consist of a device portion comprising a battery and control circuitry, an electrically operated vaporizer portion, and a consumable portion comprising an aerosol-forming substrate. A cartridge comprising both an aerosol-forming substrate and vaporizer is sometimes referred to as a "cartomiser." The cartridge portion may comprise not only the aerosol-forming substrate and an electrically operated heating element, but also a mouthpiece. The "mouthpiece" refers to a portion of the aerosol-generating device that includes a part which is placed into an adult vaper's mouth. During vaping, the adult vaper sucks on the mouthpiece to draw vapor or aerosol from the device. The vaporizer is typically a heating element, for example, comprising a coil of heater wire wound around an elongate wick soaked in liquid aerosol-forming substrate. In some examples, the aerosol-forming substrate may comprise a solid aerosol-forming substrate, such as granules or shreds of material, for example tobacco-containing material. The vaporizer may in such an example include a heating element which is arranged to heat the solid aerosol-forming substrate. In some known examples, the aerosol-forming substrate is an aerosol-forming liquid, sometimes referred to as an e-liquid.

Aerosol-generating devices are usually portable. Adult vapers often carry their device with them and, when not in use, may store their device in clothing pockets for ease of access. Such storage of the aerosol-generating devices may increase the risk of damage to the aerosol-generating devices. Some components of aerosol-generating devices may be fragile or are unable to withstand forces such as bending forces applied to them when being carried by the adult vaper. For example the movements of the adult vaper may damage the device being stored in the adult vaper's pocket. Although hardened carrying cases may be used to protect the aerosol-generating devices, such cases are necessarily bigger than the article they protect and may make the aerosol-generating device undesirably large or hard for comfortable pocket storage.

SUMMARY

According to some example embodiments, an aerosol-generating device includes a housing and a flexible device component disposed in the housing. The housing has a length and defines a flexible portion along at least a portion of the length of the housing. The flexible portion has a relaxed or unloaded configuration and is configured to adopt a flexed or deflected configuration. When the housing is in a relaxed or un-bent configuration, the flexible device component is at least partially longitudinally aligned with the flexible portion of the housing.

The flexible portion of the housing may be elastically deformable or elastically deflectable. As a result, the flexible portion may be configured to adopt the relaxed or unloaded configuration naturally or originally (e.g., as a default) when no external force or load is applied to the flexible portion. The flexible portion of the housing may be substantially linear in the relaxed or unloaded configuration. The flexible portion may define a longitudinal axis in the relaxed or unloaded configuration. The flexible portion may be configured to adopt the flexed or deflected configuration under the influence of an external force or load. The flexible portion may be configured to return to the relaxed or unloaded configuration from the flexed or deflected configuration when the external force or load is removed from the flexible portion.

The housing may define a rigid portion along at least a portion of the length of the housing. The rigid portion may be substantially inflexible.

In another example embodiment, the flexible portion of the housing defines a longitudinal axis in the relaxed or unloaded configuration. When the flexible portion of the housing is in the flexed or deflected configuration, at least a portion of the flexible portion of the housing deflects from the longitudinal axis by an angle of about 10 degrees or more, about 20 degrees or more, or about 30 degrees or more. When the flexible portion of the housing is in the flexed configuration, at least a portion of the flexible device component remains substantially longitudinally aligned with at least a portion of the flexible portion of the housing being deflected.

In another example embodiment, the flexible portion of the housing has a first end, an opposing second end, and a middle between the first end and the opposing second end. The middle is about equal distance from the first end and the opposing second end. When the housing is in the flexed configuration, the flexible portion of the housing may define a radius of curvature at the middle of the flexed portion. The radius of curvature may be about 40 mm to about 120 mm, about 50 mm to about 100 mm, or about 60 mm to about 90 mm.

In another example embodiment, the flexible device component includes one or more of a flexible power supply, which may include a flexible battery; flexible control circuitry; a flexible mouthpiece; a flexible storage component; and a flexible fluid flow passage component.

In another example embodiment, the aerosol-generating device includes a rigid portion which may include a heating element.

In another example embodiment, the aerosol-generating device includes a rigid portion which may include a mouthpiece. The mouthpiece may be a rigid mouthpiece. The rigid mouthpiece may be substantially inflexible. The rigid portion may be at a first end of the aerosol-generating device and comprise a rigid mouthpiece and the flexible portion may be arranged at a second, opposite end of the aerosol-generating device.

The aerosol-generating devices described herein may provide one or more advantages over previously available or described aerosol-generating devices. For example, providing an aerosol-generating device with flexible components, for example, flexible electrical components and a flexible housing, may reduce the risk of breaking while stored in a pocket. In addition, the flexible components and flexible housing may permit the aerosol-generating device to bend with the adult vaper or adult vaper's clothing during storage, thereby providing greater comfort for the adult vaper when the aerosol-generating device is stored in next-to-body pockets or locations. The decreased fragility of an aerosol-generating device with flexible components and a flexible housing may also decrease the risk that an aerosol-generating device will be damaged when carried in a bag such as a purse, satchel, or backpack. These and other advantageous will be readily understood upon reading the disclosure presented herein.

The aerosol-generating device may include a housing and a flexible device component disposed in the housing. The flexible device component may include, for example, a flexible power supply, a flexible storage component, a flexible fluid flow passage component, a flexible control circuitry, and other suitable flexible components.

At least a portion of the housing of the aerosol-generating device is flexible. Device components are disposed in the housing. Some of the device components may be flexible. For example, one or more flexible components may be disposed within a flexible portion of the housing. In addition, the flexible portion of the housing may define the amount that the device may flex to protect the underlying device components.

A housing of an aerosol-generating device may extend the full length of the aerosol-generating device or only a portion of the length of the aerosol-generating device. The flexible portion of the housing may be a continuous portion of the housing or a discontinuous portion of the housing.

At least a portion of the housing is flexible. For example, the length of the flexible portion of the housing may be about 25% to about 70%, about 25% to about 80%, about 25% to about 90%, or about 25% to about 100% of the total length of the housing.

Various components of the aerosol-generating device may be disposed within the housing including, for example, one or more of a power supply including, for example, a battery; control circuitry; a vaporizer including, for example, a heating element; a storage component including, for example, an aerosol-forming substrate; a fluid flow passage component; a vaporizer; a mouthpiece; or other component.

Various device components of the aerosol-generating device may be disposed within the flexible portion of the housing including, for example, one or more of a power supply including, for example, a battery; control circuitry; a vaporizer including, for example, a heating element; a storage component including, for example, an aerosol-forming substrate; a fluid flow passage component; a vaporizer; a heating element; a mouthpiece; or other suitable components. As further discussed below, one or more components of the aerosol-generating device disposed within the flexible portion of the housing may be flexible.

Components of the aerosol-generating device may be disposed within a rigid portion of the housing. For example, at least one of a heating element and a storage component may be disposed in a rigid portion of the housing. The terms "rigid" and "inflexible" refer to an element or a portion being less flexible than the "flexible" element or portion.

An aerosol-generating device may be flexible or include a flexible portion. A "flexible" aerosol-generating device, device portion, or device component is a device, device portion, or device component that may elastically bend or deflect to a certain extent upon the application of external force or load at room temperature and may return to a relaxed configuration, or may be returned to its original unloaded configuration, without any portion of the device breaking or being permanently deformed. A "relaxed configuration" of the aerosol-generating device, device portion, or a device component refers to the state of the aerosol-generating device, device portion, or device component in the absence of the application of external force or load.

An aerosol-generating device may include a rigid portion or device component. A "rigid" device portion or device component is a device portion or device component that may elastically bend or deflect to a lesser extent than a flexible device portion or flexible device component upon the application of external force or load at room temperature. The rigid device portion or device component may be inelastic. The degree of inflexibility may depend on the device part or device component.

When in a relaxed or unloaded configuration, the aerosol-generating device, a flexible portion of the housing of the aerosol-generating device, and/or a flexible device component of the aerosol-generating device has a longitudinal axis. When in a maximum flexed or loaded configuration, at least a portion of the aerosol-generating device, the flexible portion of the housing of the aerosol-generating device, and/or a flexible device component of the aerosol-generating device deflects from the longitudinal axis by an angle of about 10 degrees to about 100 degrees including, about 20 to about 90 degrees, or about 30 to about 80 degrees. The deflection from the longitudinal axis may be, for example, at least about 10 degrees, at least about 15 degrees, at least about 20 degrees, at least about 25 degrees, at least about 30 degrees, at least about 35 degrees, at least about 40 degrees, at least about 50 degrees, at least about 60 degrees, at least about 70 degrees, at least about 80 degrees, at least about 90 degrees, at least about 95 degrees. In an example embodiment, the deflection may not exceed about 100 degrees.

As used herein, a "maximum flexed configuration" is the maximum amount that a device, housing, or component may be flexed without breaking or plastically deforming the device, housing, or component. The housing may be designed to resist further flexing to an extent less than the maximum flexed configuration of a flexible component disposed in the flexible portion of the housing, if there is a flexible component disposed in the flexible portion of the housing. Accordingly, the housing may resist flexing of the device to an extent that may cause an internal component to break.

A flexible portion of an example device may deflect from the longitudinal axis in a symmetrical manner or in an asymmetrical manner. For example, a portion of the device, flexible portion of the housing, or a flexible component of the device may deflect along the length of the flexible portion to the same extent in different directions or to different extents or in different directions.

The flexible portion of the housing of the aerosol-generating device has a first end, an opposing second end, and a middle between the first end and the second end, the middle is about an equal distance from the first end as it is from the second end. When the flexible portion of the housing of the aerosol-generating device is in a flexed configuration, the flexible portion defines a radius of curvature at the middle of the flexed portion. The "radius of curvature" is a measure at a particular point on a curve of the radius of the circle which best approximates the curve at that point. The radius of curvature of the flexible portion of the housing may be about 40 mm to about 120 mm, about 50 mm to about 100 mm, or about 60 mm to about 90 mm. For instance, the radius of curvature may be about 80 mm. The radius of curvature may be measured when the flexible portion of the housing is in a maximum flexed configuration.

In an example embodiment, the flexible portion of the housing defines the amount that the flexible components of the device may flex or deflect.

The housing of the aerosol-generating device may be made of any suitable material or materials. At least a portion of the housing that is flexible is made from a material or materials that permit the flexible portion of the housing to have a relaxed or un-bent configuration and to be configured to adopt a flexed configuration. The housing may comprise one, two, or more elements which may for example be releasably or non-releasably attached together.

For example, the housing may be made of one material, two materials, three materials, four materials, five materials, or more than five materials. The housing may be formed, for example, by molding or overmolding or may be assembled.

The materials forming the housing may include at least one of elastomeric compounds, polymeric compounds, elastomeric or rubber compounds except natural rubber compounds, and polyurethane based compounds. The elastomeric materials may include, for example, compounds containing ethylene propylene diene monomer (EPDM), vinyl methyl quality (VMQ) silicone, fluorovinylmethylsiloxane (FVMQ), or other appropriate material or combination of materials. The polymeric compounds may include, for example, compounds containing, for example, polypropylene (PP), polyamide (PA), fluorinated ethylene propylene (FEP), polyethylene (PE), cross-linked polyethylene (XPLE or PEX), polyether ether ketone (PEEK), or other appropriate polymeric compounds. The polymeric compounds may include thermoplastics including, for example, Crastin® Polybutylene Terephthalate, Delrin® Acetal Homopolymer Resin, Hytrel® Thermoplastic Elastomer, and Zytel® Nylon Resin, or other appropriate material or combination of materials.

The housing may further include a coating. All or some of the housing of the aerosol-generating device may further include a coating. The materials forming the coating of the housing may include, for example, elastomeric materials.

The flexible portion of the housing may include a polymeric compound and further includes a coating that includes elastomeric or rubber compounds or polyurethane based compounds. For example, the materials forming the flexible portion of the housing may include compounds including at least one of polypropylene (PP), polyamide (PA), fluorinated ethylene propylene (FEP), polyethylene (PE), and cross-linked polyethylene (XPLE or PEX) or thermoplastics including at least one of Crastin® Polybutylene Terephthalate, Delrin® Acetal Homopolymer Resin, Hytrel® Thermoplastic Elastomer, and Zytel® Nylon Resin. The materials forming the flexible portion of the housing may further include materials forming a coating including compounds including at least one of ethylene propylene diene monomer (EPDM), vinyl methyl quality (VMQ) silicone, and fluorovinylmethylsiloxane (FVMQ).

One or more flexible components of an aerosol-generating device may be disposed in the housing. For example, an aerosol-generating device may include a flexible power supply. A flexible power supply may be disposed in the flexible portion of the housing. The flexible power supply may be at least partially longitudinally aligned with at least a portion of the flexible portion of the housing. The flexible power supply may be made of any material or materials that allows the portion of the power supply that is longitudinally aligned with the flexible portion of the housing to flex at least as much as the flexible portion of the housing when the flexible portion of the housing is in the flexed configuration. Thus, the device is configured so that such flexion or deflection occurs without damage to the flexible power supply. In addition, the flexible power supply may remain longitudinally aligned with the flexible portion of the housing when the flexible portion of the housing is in the flexed configuration and when the flexible portion of the housing returns to the relaxed configuration.

The flexible power supply may include at least one battery. The battery may be a rechargeable or non-rechargeable battery. A rechargeable battery may include, for example, a lithium ion battery, including for example, a lithium ion manganese oxide battery; a nickel metal hydride battery; a thin film battery, or other battery. A non-rechargeable battery may include, for example, a button cell battery, a lithium battery, or other battery. The battery may be flexible, for example, a thin film battery. The battery may be incorporated in a flexible electronics matrix.

The flexible power supply may include two or more electronic modules connected by flexible connectors. The electronic modules may be flexible or rigid. For example, the flexible power supply may include either substantially flexible or rigid electronic modules or both substantially flexible and rigid electronic modules and flexible connectors. The flexible connectors may include ribbon wires. The electronic modules may be batteries. The two or more batteries may be configured in a series, in parallel, or in a mixture of both to provide the desired voltage, capacity, or power density.

In addition or in the alternative, one or more flexible components other than a flexible power supply may be disposed in a flexible portion of the housing. Examples of other flexible components include a flexible storage component, a flexible fluid flow passage component, a flexible control circuitry, and other suitable flexible components.

An aerosol-generating device may comprise flexible control circuitry. The control circuitry may, for example, control the supply of power to a heating element. At least a portion of the flexible control circuitry may be disposed within the housing and may be at least partially longitudinally aligned with at least a portion of the flexible portion of the housing. For example, when the housing is in the flexed configuration, at least a portion of the flexible control circuitry remains longitudinally aligned with at least a portion of the flexible portion of the housing.

The control circuitry may be made of any material or materials that allows the portion of the control circuitry that is longitudinally aligned with the flexible portion of the housing to flex at least as much as the flexible portion of the housing when the flexible housing when the flexible portion of the housing is in the flexed configuration. In an example embodiment, such flexion or deflection occurs without damage to the flexible control circuitry. In addition, the flexible control circuitry may remain longitudinally aligned with the flexible portion of the housing or the neutral axis of the housing when the flexible portion of the housing is in the flexed configuration and when the flexible portion of the housing returns to the relaxed or unloaded configuration.

The flexible control circuitry may include either a flexible printed circuit board or a rigid-flex circuit or both a flexible printed circuit board and a rigid-flex circuit. The flexible control circuitry may include two or more electronic modules connected by flexible connectors. The electronic modules may be flexible or rigid.

The aerosol-generating device may include a flexible storage component. The flexible storage component may include an aerosol-forming substrate. The aerosol-forming substrate may include nicotine. The aerosol-forming substrate or pre-vapor formulation may be a solid or an aerosol-forming liquid, sometimes referred to as an e-liquid. In particular, the aerosol-forming substrate or pre-vapor formulation may be a liquid, solid, and/or gel formulation including, but not limited to, water, beads, solvents, active ingredients, ethanol, plant extracts, natural or artificial flavors, and/or vapor formers such as glycerin and propylene glycol. The flexible storage component may include a flexible reservoir. Examples of flexible reservoirs that may be used in an aerosol-generating device include, for example, a bag or a pouch.

The aerosol-generating device may include a flexible fluid flow passage component. The fluid flow passage component may include a flexible tube. The fluid flow passage component may be made of any suitable material or materials. For example, the fluid flow passage component may be made of a polymeric material.

The aerosol-generating device may include a heating element. The aerosol-generating device may include more than one heating element, or, for example, two, or three, or four, or five, six, or more than six heating elements. One or more heating elements may be an inductive heating element. One or more heating elements may be a conductive heating element. One or more of the heating elements may be disposed within a rigid portion of the housing.

The aerosol-generating device may include a mouthpiece. The mouthpiece may be disposed outside the housing of the aerosol-generating device. The mouthpiece may also be disposed within the housing of the aerosol-generating device including, for example, within the flexible portion of the housing of the aerosol-generating device. Alternatively, the mouthpiece may extend from or form a portion of the housing.

The mouthpiece may be flexible, partially flexible, or rigid. The mouthpiece may include a rigid core including, for example, a metallic tube, or a flexible core. The mouthpiece may include a cap. The cap may be separate from or integrated with the housing. The cap may be flexible, partially flexible, or rigid. The mouthpiece portion may be part of a cartridge.

The aerosol-generating device may be substantially “flat” or “planar” and may have, for example, a rectangular cross section. Alternatively, the aerosol-generating device may be elliptical, or another shape, in cross section. In another instance, the aerosol-generating device may be substantially cylindrical in shape in cross section. The aerosol-generating device article may be substantially elongate. The aerosol-generating device may have a length and a circumference substantially perpendicular to the length.

The aerosol-generating device may have a size comparable to a cigar or cigarette. The aerosol-generating device may have a total length of about 30 mm to about 150 mm. The aerosol-generating device may have an external diameter of about 5 mm to about 30 mm. In an example embodiment, the aerosol-generating device may have an external diameter of about 5 mm to about 12 mm. The aerosol-generating device may have an external circumference of about 15 mm to about 150 mm.

In a non-limiting configuration, the aerosol-generating device has a total length of about 45 mm. The aerosol-generating device may have an external diameter of about 7.2 mm.

The flexible portion of the housing may make up about 25% to about 70% of the total length of the aerosol-generating device, for example, about 30% to about 70% of the length of the aerosol-generating device, about 35% to about 70% of the length of the aerosol-generating device, about 40% to about 70% of the length of the aerosol-generating device, about 45% to about 70% of the length of the aerosol-generating device, or about 50% to about 70% of the length of the aerosol-generating device.

Thus, various aspects of one or more example embodiments provide an aerosol-generating device, such as an electrically operated device, for example a vaping article, having a flexible portion. For example, the device may have a flexible component disposed within a flexible portion of a housing. Some aspects of example embodiments also relate to flexible electrical components disposed within a flexible housing, for example, for use in an aerosol-generating device. The flexible electrical components may include, for example, a power supply or control circuitry.

It should be understood that any feature in one aspect of the example embodiments may be applied to other aspects of the example embodiments, in any appropriate combination. That is, any, some, or all of the features in one aspect may be applied to any, some, or all features in another aspect, in any appropriate combination. It should also be appreciated that particular combinations of the various features described and defined in any aspects of the example embodiments may be implemented or supplied or used independently.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
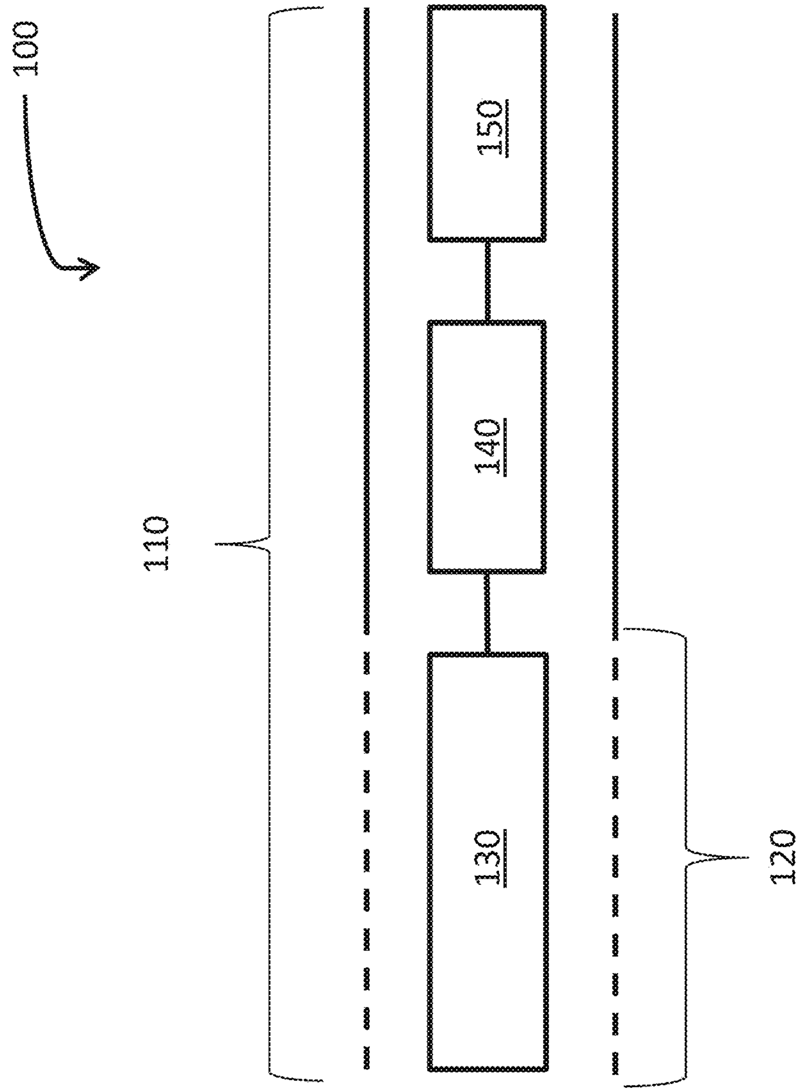
FIG. 1A shows a schematic representation of an aerosol-generating device in accordance with an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A shows a schematic representation of an aerosol-generating device 100 in accordance with an example embodiment. As shown in FIG. 1A, the aerosol-generating device 100 has a housing 110. The electrical components 130 of the aerosol-generating device 100 are disposed within the flexible portion 120 of the housing 110. The electrical components 130 may include a flexible device component. The aerosol-generating device 100 may further include a heating element 140 and a mouthpiece 150 disposed within the housing 110. For instance, the heating element 140 and the mouthpiece 150 may be disposed within a rigid portion of the housing. Alternatively, a portion of the housing 110 may form the mouthpiece or the mouthpiece may be attached/appended to the housing 110.

Figure 1B:
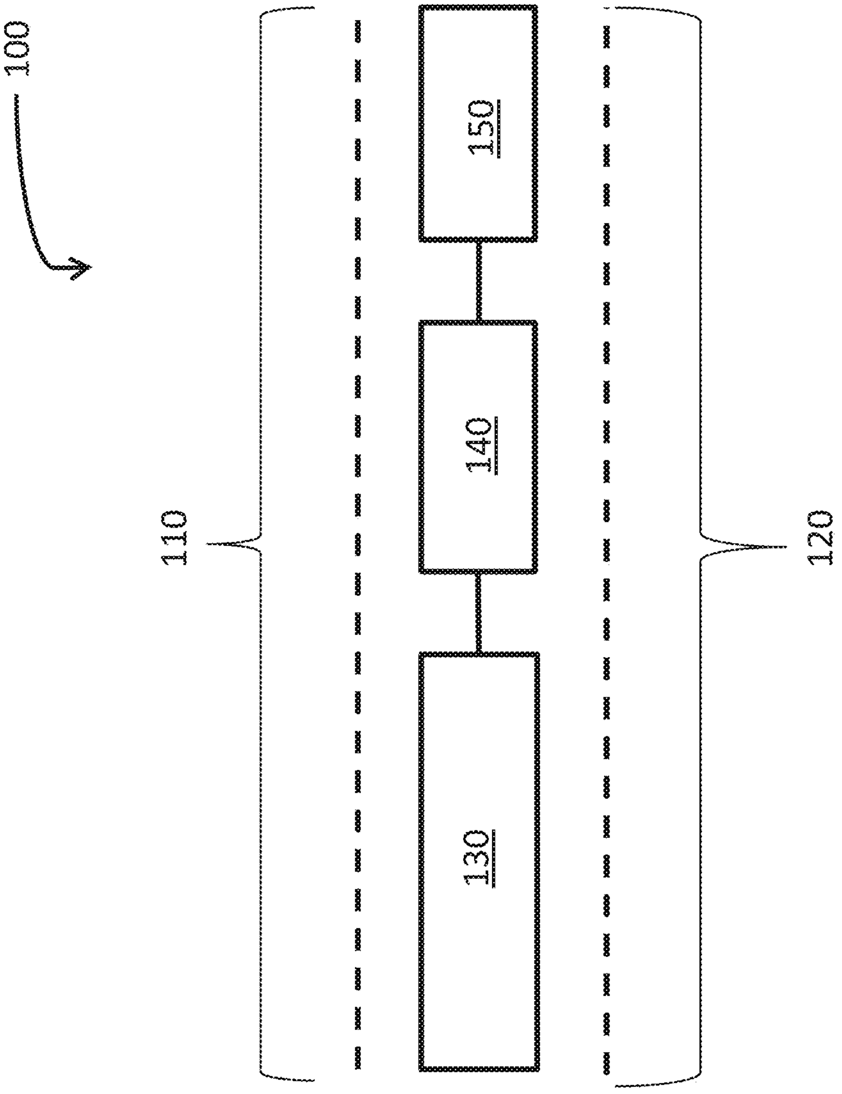
FIG. 1B shows a schematic representation of an aerosol-generating device in accordance with another example embodiment.

FIG. 1B shows a schematic representation of an aerosol-generating device 100 in accordance with another example embodiment. The electrical components 130, the heating element 140, and the mouthpiece 150 of the aerosol-generating device 100 are disposed within the flexible portion 120 of the housing 110. One or more of the electrical components 130, the heating element 140, and the mouthpiece 150 may be a flexible device component.

Figure 1C:
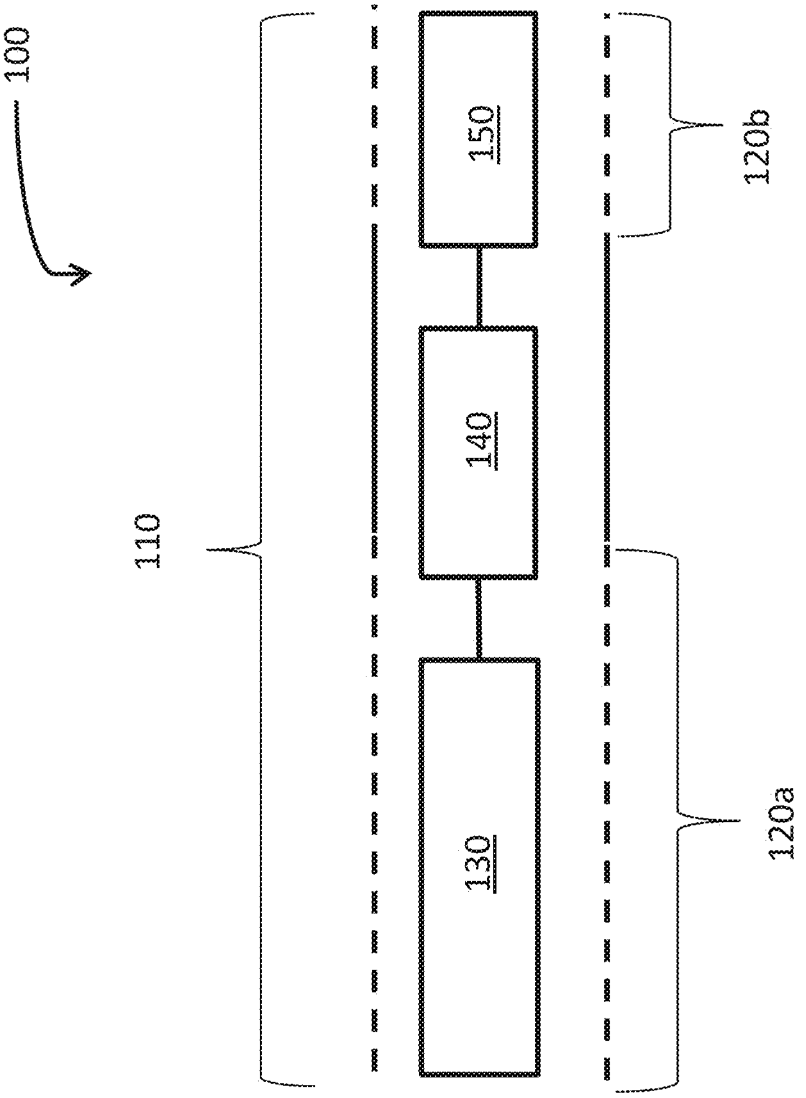
FIG. 1C shows a schematic representation of an aerosol-generating device in accordance with another example embodiment.

FIG. 1C shows a schematic representation of an aerosol-generating device 100 in accordance with another example embodiment. The electrical components 130 and the mouthpiece 150 of the aerosol-generating device 100 are disposed within flexible portions **120*a*, 120*b* of the housing 110, and the heating element 140 is disposed in a rigid portion of the housing 110. The electrical components 130 or the mouthpiece 150** or both may be a flexible device component.

Figure 1D:
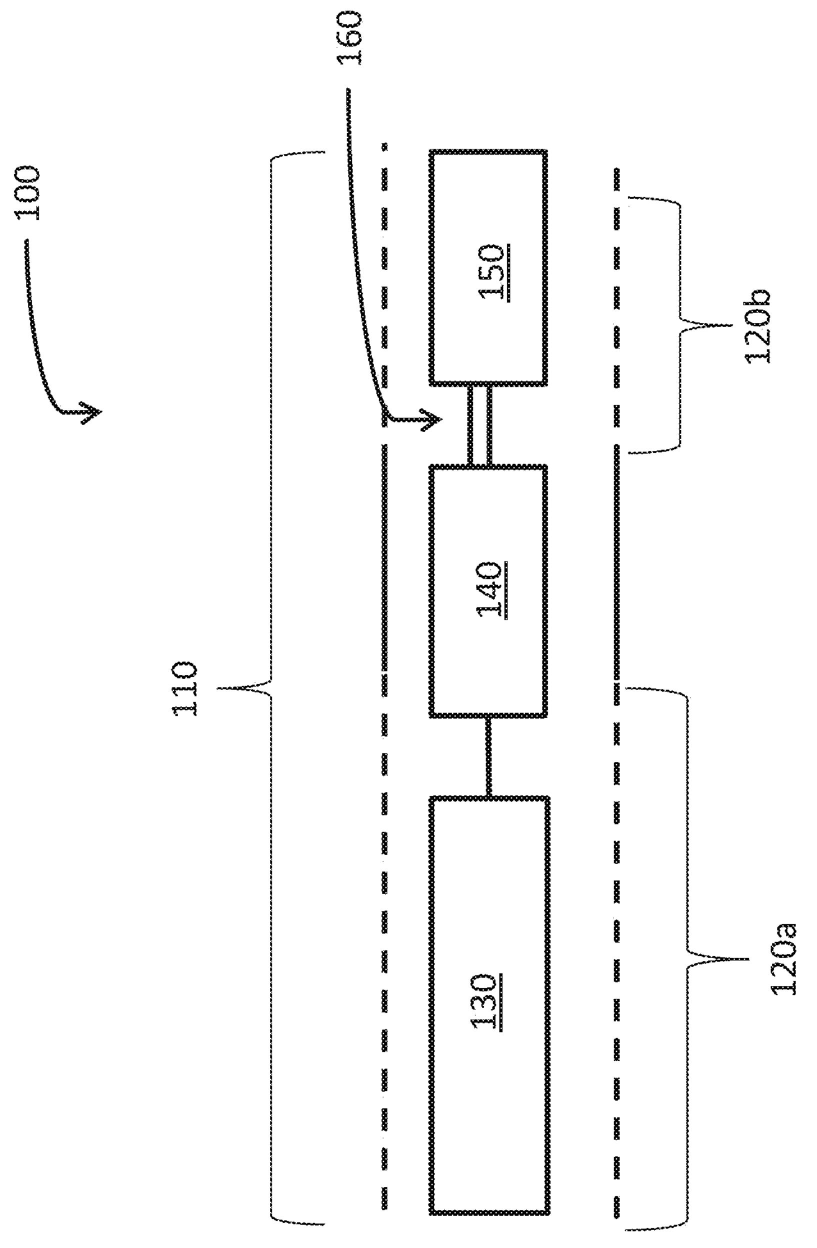
FIG. 1D shows a schematic representation of an aerosol-generating device in accordance with another example embodiment.

FIG. 1D shows a schematic representation of an aerosol-generating device 100 in accordance with another example embodiment. A flexible fluid flow passage 160 is disposed within the flexible portion **120*b* of the housing 110. The flexible fluid flow passage 160 may be between the heating element 140 and the mouthpiece 150. Reference is made to the discussion above regarding FIGS. 1A, 1B, and 1C for the numbered elements depicted in, but not specifically described regarding, FIG. 1**D.

Figure 1E:
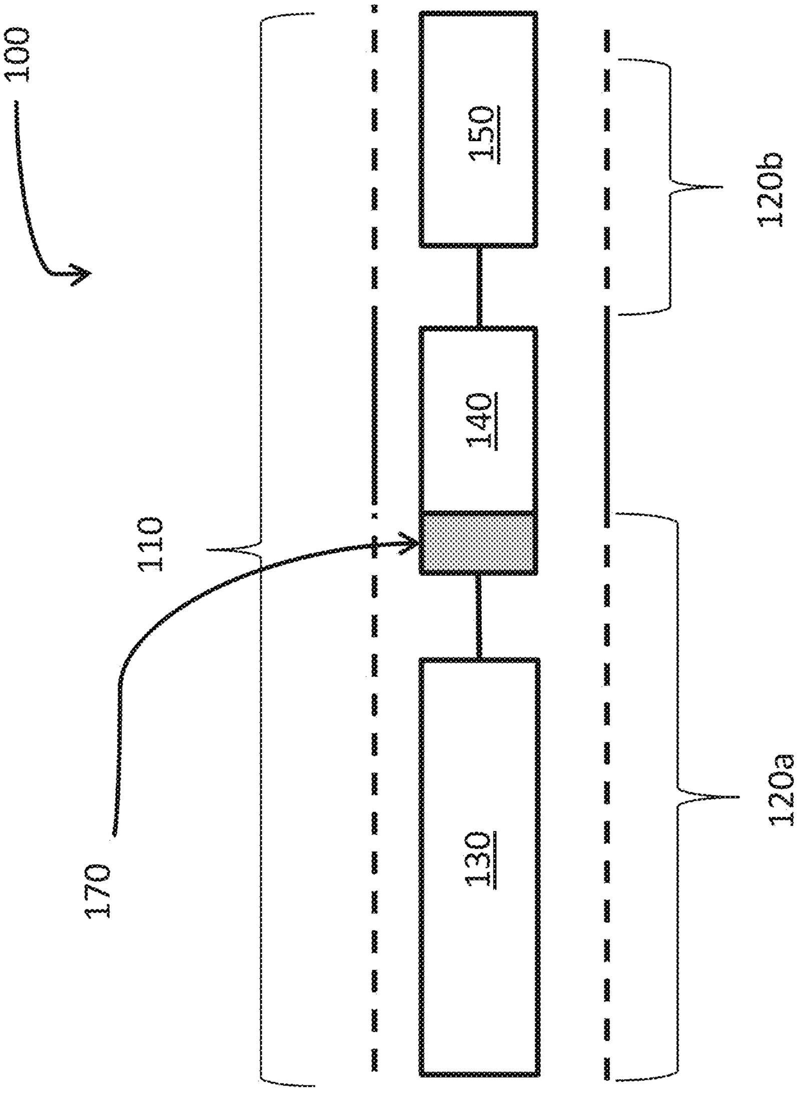
FIG. 1E shows a schematic representation of an aerosol-generating device in accordance with another example embodiment.

FIG. 1E shows a schematic representation of an aerosol-generating device 100 in accordance with another example embodiment. A flexible storage compartment 170 is disposed within a flexible portion **120*a* of the housing 110. The aerosol-forming substrate may be located within the flexible storage compartment 170. The aerosol-forming substrate may include nicotine. The aerosol-forming substrate may also be liquid. Reference is made to the discussion above regarding FIGS. 1A, 1B, 1C, and 1D for the numbered elements depicted in, but not specifically described regarding, FIG. 1**E.

Figure 2A:
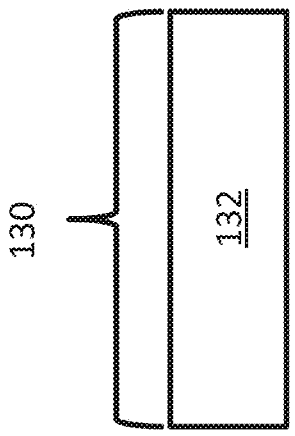
FIG. 2A shows a schematic representation of the flexible electrical components of an aerosol-generating device in accordance with an example embodiment.
Figure 2B:
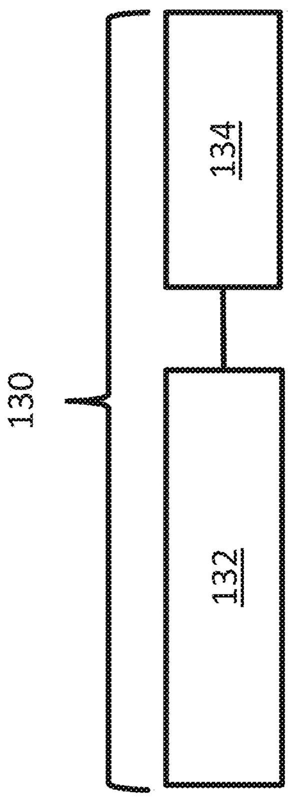
FIG. 2B shows a schematic representation of the flexible electrical components of an aerosol-generating device in accordance with another example embodiment.

FIG. 2A shows a schematic representation of the electrical components 130 of an aerosol-generating device including a power supply 132 in accordance with an example embodiment. The power supply 132 may be flexible. FIG. 2B shows a schematic representation of the electrical components 130 of an aerosol-generating device including a power supply 132 and control circuitry 134 in accordance with an example embodiment. One or both of the power supply 132 and the control circuitry 134 may be flexible.

Figure 3:
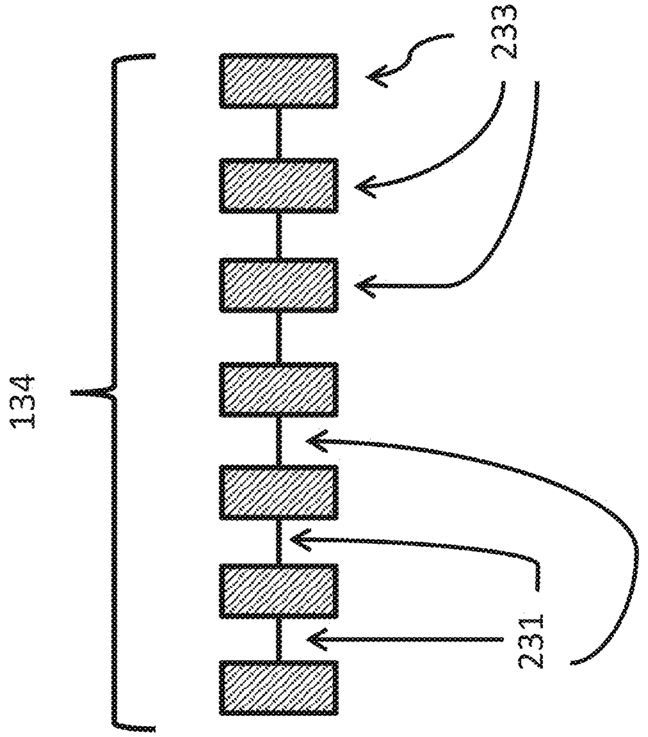
FIG. 3 shows a schematic representation of the flexible electrical components of an aerosol-generating device in accordance with an example embodiment.

FIG. 3 shows a schematic representation of the control circuitry 134 of an aerosol-generating device including electronic modules 233 and flexible connectors 231 in accordance with an example embodiment. At least some of the electronic modules 233 may be flexible. Additionally, at least some of the electronic modules 233 may be rigid. The electronic modules 233 may be batteries.

Figure 4:
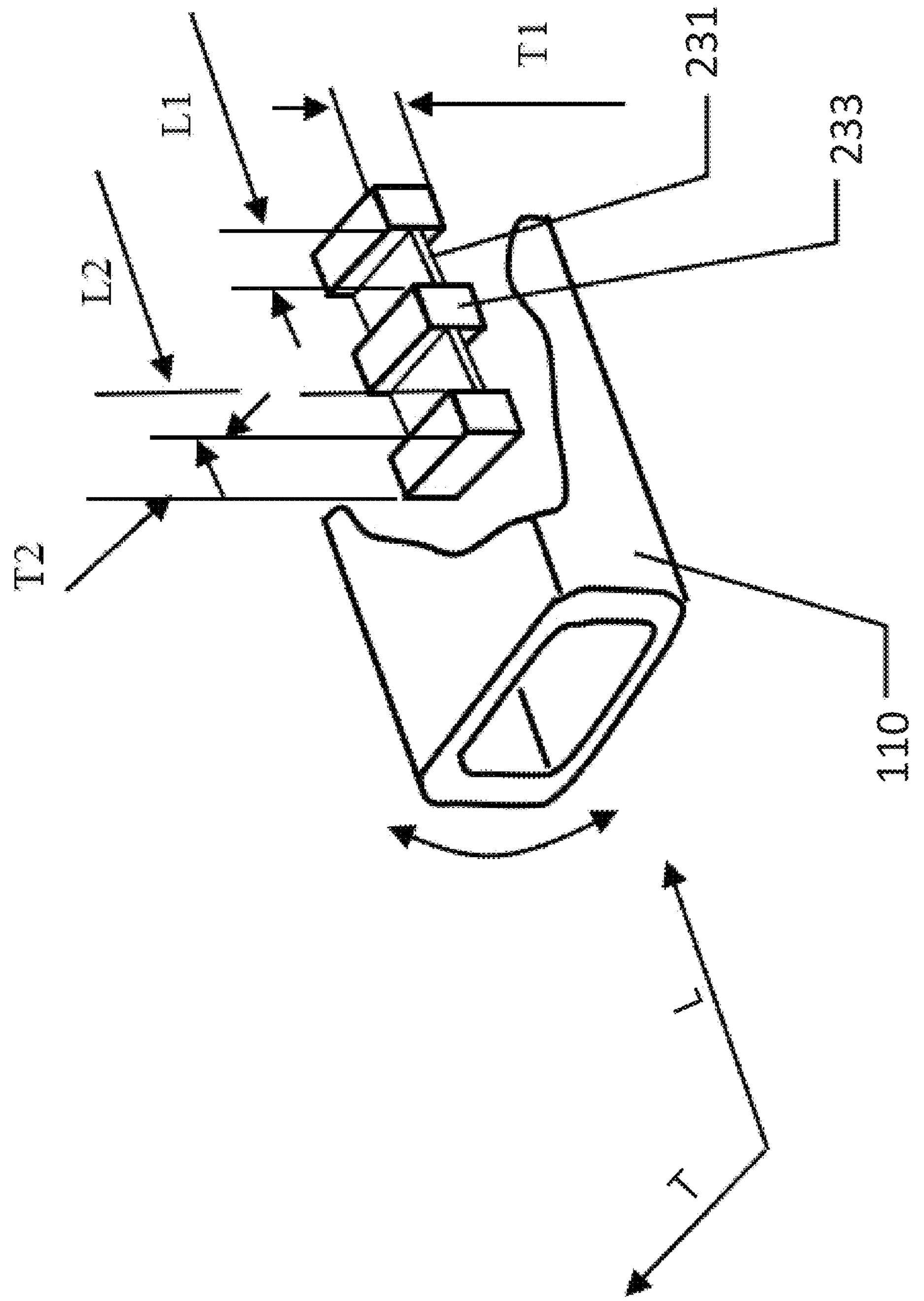
FIG. 4 shows the electrical components and the housing of an aerosol-generating device in accordance with an example embodiment.

FIG. 4 is a perspective cut-away view showing some components of an aerosol-generating device according to an example embodiment. The depicted components include a housing 110, electronic modules 233, and flexible connectors 231. The flexible connectors 231 may be a ribbon wire. "L" in FIG. 4 refers to a longitudinal direction of the device, and "T" refers to a transverse direction of the device. "L1" in FIG. 4 refers to a length of a flexible connector 231; "L2" refers to the length of an electronic module 233. "T1" in FIG. 4 refers to the height or thickness of an electronic module 233; and "T2" refers to the width of an electronic module 233.

Figure 5:
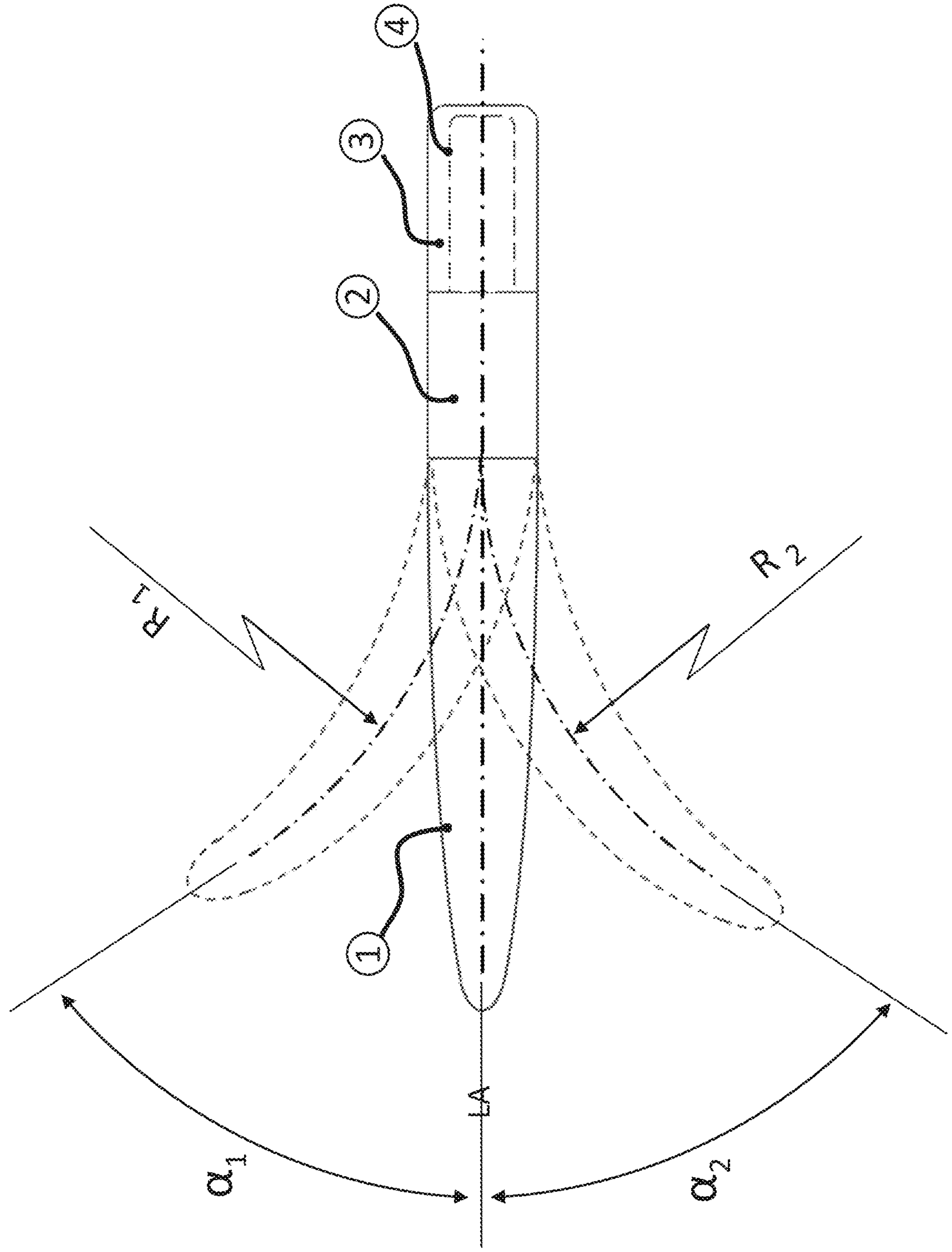
FIG. 5 shows the housing of an aerosol-generating device in accordance with an example embodiment.

FIG. 5 shows the housing of an aerosol-generating device in accordance with an example embodiment. The housing has a flexible portion (1), a middle portion (2), and a mouthpiece portion (3-4). "LA" in FIG. 5 refers to the longitudinal axis of the device when the flexible portion of the housing is in a relaxed configuration. As shown in FIG. 5, when the flexible portion (1) of the housing is in a flexed configuration, at least a portion of the flexible portion (1) of the housing deflects from LA by an angle, $\alpha_1$ or $\alpha_2$. The angle $\alpha_1$ may be 10 degrees or more. The angle $\alpha_2$ may also be 10 degrees or more. Additionally, when the flexible portion (1) of the housing is in the flexed configuration, at least a portion of the flexible portion (1) of the housing may deflect from LA by an angle of about 10 degrees to about 70 degrees. For example, either $\alpha_1$ or $\alpha_2$ or both may be about 10 degrees to about 70 degrees. The flexible portion (1) of the housing may deflect from LA by the same amount in two or more directions or by different amounts in two or more directions.

As shown in FIG. 5, the flexible portion (1) of the housing may have a first end, a second end, and a middle. The middle of the flexible portion (1) of the housing is the same distance from the first end of the flexible portion (1) of the housing as it is from the second end of the flexible portion (1) of the housing. When the housing is in the flexed configuration, the flexible portion (1) may define a radius of curvature $R_1$ or $R_2$ at the middle of the flexed portion. $R_1$ may be about 60 mm to about 100 mm or $R_2$ may be about 60 mm to about 100 mm, or both $R_1$ and $R_2$ may be about 60 mm to about 100 mm.

The middle portion (2) may be rigid, at least at its core, and may include components that require solid assembly or precise fitting and interface. The middle portion (2) may be overmolded or coated to provide the same appearance and physical characteristics as the flexible portion (1).

The mouthpiece portion (3-4) may include a core (4) or a cap (3), or both. The cap (3) may be flexible, partially flexible, or rigid. The cap (3) may include a metallic tubular housing core (4) or a flexible core (4). The core (4) or the cap (3) may be overmolded or coated to match the flexible portion (1), the middle portion (2), or both. The cap (3) may form part of the housing. The mouthpiece portion (3-4) may be part of a cartridge (not shown).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating device comprising:

a housing including a rigid portion, a first flexible portion, and a second flexible portion, the first and second flexible portions configured to deform in response to an external force, the housing defining a longitudinal axis when the first flexible portion, the second flexible portion, and the rigid portion are aligned;

electronic modules within the housing, the electronic modules connected in series by flexible connectors, at least one of the electronic modules being in the first flexible portion, and at least another one of the electronic modules being in the rigid portion; and a mouthpiece connected to the second flexible portion.

2. The aerosol-generating device according to claim 1, wherein the electronic modules are configured to remain longitudinally aligned with the housing in a relaxed configuration.

3. The aerosol-generating device according to claim 1, wherein the electronic modules include a rigid electronic module that is configured to remain longitudinally aligned with the rigid portion of the housing in a deformed configuration.

4. The aerosol-generating device according to claim 1, wherein the electronic modules include a flexible electronic module that remains longitudinally aligned with at least a section of the first flexible portion of the housing being deflected when the first flexible portion of the housing is in a deformed configuration.

5. The aerosol-generating device according to claim 1, wherein the first flexible portion has a deformed configuration and a relaxed configuration.

6. The aerosol-generating device according to claim 5, wherein at least a section of the first flexible portion of the housing is configured to deflect from the longitudinal axis by an angle of about 10 degrees to about 100 degrees when the first flexible portion of the housing is in the deformed configuration.

7. The aerosol-generating device according to claim 1, wherein a length of the first flexible portion of the housing is about 25% to about 100% of a total length of the housing.

8. The aerosol-generating device according to claim 1, wherein the first flexible portion of the housing has a first end, an opposing second end, and a middle between the first end and the opposing second end, the middle is about equal distance from the first end and the opposing second end, and the first flexible portion of the housing defines a radius of curvature at the middle of about 40 mm to about 120 mm when in a deformed configuration.

9. The aerosol-generating device according to claim 1, wherein the electronic modules include a power supply.

10. The aerosol-generating device according to claim 9, wherein the power supply includes a battery.

11. The aerosol-generating device according to claim 1, wherein the electronic modules include control circuitry.

12. The aerosol-generating device according to claim 1, further comprising:

an aerosol-forming substrate disposed in the housing.

13. The aerosol-generating device according to claim 12, wherein the aerosol-forming substrate includes nicotine.

14. The aerosol-generating device according to claim 1, wherein the flexible connectors are in a form of a ribbon.

15. The aerosol-generating device according to claim 1, wherein the first and second flexible portions and the rigid portion are covered with a same material.

16. The aerosol-generating device according to claim 1, wherein the mouthpiece includes a core and a cap, the core being rigid and the cap being flexible.

* * * * *